Feb. 28, 1933.   O. HACHFELD   1,899,502
ELECTROMAGNET
Filed Jan. 24, 1931

Inventor
Otto Hachfeld
Attorney

Patented Feb. 28, 1933

1,899,502

UNITED STATES PATENT OFFICE

OTTO HACHFELD, OF BERLIN, GERMANY, ASSIGNOR TO SIEMENS & HALSKE AKTIEN-GESELLSCHAFT, OF SIEMENSSTADT NEAR BERLIN, GERMANY

ELECTROMAGNET

Application filed January 24, 1931, Serial No. 510,887, and in Germany March 28, 1930.

The present invention relates to a relay, particularly for telephone purposes, which is combined with a dry rectifier into a single unit.

It has been proposed to arrange the separate rectifying elements of so-called dry rectifiers, for example, the copper plates of a copper-oxide rectifier, directly on the relay core, in such a manner that special supporting means are unnecessary. In an arrangement of this kind, particular operations are obtained with these relays due to the copper elements acting as short circuit windings because of the formation of eddy currents, and this results in the elimination of the rattle when operated with alternating current and delays the attraction and release of the armature.

According to the present invention it is possible to operate relays with the rectifying elements assembled on the magnet core proper, where a rapid attraction and release of the armature is required. This is accomplished by making the plates of the rectifier slotted so they are electrically disconnected at their ends. The copper mass of the rectifier cannot then act as a short circuit winding, and the armature of the relay operates like any normal direct current relay without any slow action.

An embodiment of the invention is illustrated in accordance with the description and the drawing in which.

Figure 1:
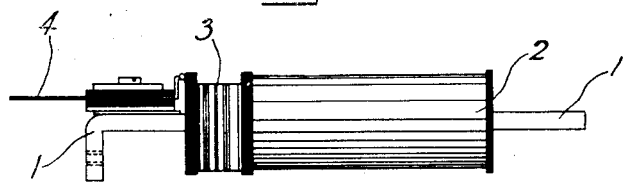
Fig. 1 shows a front view of the relay and rectifier with the parts unnecessary for the invention removed, such as armatures, set of contact springs, etc.
Figure 2:
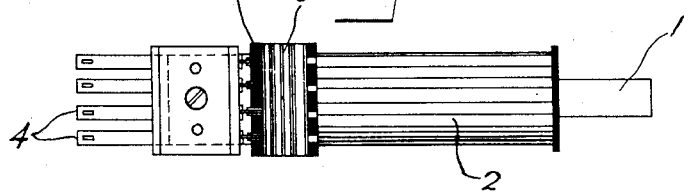
Fig. 2 shows the relay seen from above.
Figure 3:
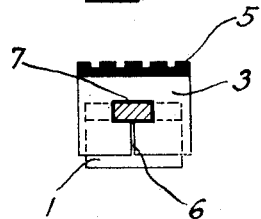

Fig. 3 a section through the relay and rectifier.

The core 1 of the relay is of flat construction and the separate plates of the dry rectifier 3 separated by insulating layers 7 from the core 1, are pushed over it behind the relay winding 2. The current input to the rectifier elements 3 as well as to the winding 2 is effected over the connecting terminals 4 and by way of the slotted ends of the insulating plates 5 on each side of the rectifying element 3. As shown by Fig. 3, the separate plates of the rectifier 3, underneath the core of the relay, are provided with slots 6 extending inward to the core 1, so as to render each plate electrically disconnected at its ends.

The section of the relay core, as well as the shape of the rectifying plates can, of course, be constructed in any manner desired; for example, they can be made round.

According to the desired action of the rectifier 3, this can be connected over the terminals 4 either in parallel or series circuit with the winding 2 of the relay.

What is claimed is:

1. In a relay, a core, a winding on said core for operating said relay, a rectifier comprising copper oxidized discs mounted on said core, said copper discs partially surrounding said core so as to be electrically disconnected at their ends to prevent the relay from operating and releasing in a sluggish manner due to the formation of eddy currents in the discs when the winding is energized and deenergized.

2. In a relay, a core, a winding on said core for operating said relay, a rectifier comprising copper oxidized discs mounted on said core, said copper discs surrounding said core and having a slot cut reentrant to the core to interrupt the electrical continuity of each disc and prevent the formation of eddy currents when the winding is energized and deenergized so as not to render the relay sluggish in operation and release.

In witness whereof, I hereunto subscribe my name this 23rd day of December, A. D. 1930.

OTTO HACHFELD.